United States Patent
Nakagawa et al.

(10) Patent No.: US 11,607,652 B2
(45) Date of Patent: Mar. 21, 2023

(54) COMPOSITE SEPARATION MEMBRANE

(71) Applicant: NATIONAL UNIVERSITY CORPORATION KOBE UNIVERSITY, Hyogo (JP)

(72) Inventors: Keizo Nakagawa, Hyogo (JP); Misato Kunimatsu, Hyogo (JP); Tomohiro Sera, Hyogo (JP); Takuji Shintani, Hyogo (JP); Tomohisa Yoshioka, Hyogo (JP); Hideto Matsuyama, Hyogo (JP)

(73) Assignee: NATIONAL UNIVERSITY CORPORATION KOBE UNIVERSITY, Hyogo (JP)

( * ) Notice: Subject to any disclaimer, the term of this patent is extended or adjusted under 35 U.S.C. 154(b) by 14 days.

(21) Appl. No.: 16/967,366

(22) PCT Filed: Jan. 29, 2019

(86) PCT No.: PCT/JP2019/003016
§ 371 (c)(1),
(2) Date: Aug. 4, 2020

(87) PCT Pub. No.: WO2019/155946
PCT Pub. Date: Aug. 15, 2019

(65) Prior Publication Data
US 2021/0237004 A1 Aug. 5, 2021

(30) Foreign Application Priority Data
Feb. 7, 2018 (JP) .............................. JP2018-020508

(51) Int. Cl.
*B01D 71/82* (2006.01)
*B01D 69/10* (2006.01)
(Continued)

(52) U.S. Cl.
CPC ........... *B01D 71/82* (2013.01); *B01D 69/105* (2013.01); *B01D 69/12* (2013.01); *B01D 69/148* (2013.01);
(Continued)

(58) Field of Classification Search
None
See application file for complete search history.

(56) References Cited

U.S. PATENT DOCUMENTS

2008/0156721 A1 7/2008 Noda et al.
2012/0000845 A1 1/2012 Park et al.
(Continued)

FOREIGN PATENT DOCUMENTS

CN 106283894 A * 1/2017
EP 0 332 789 9/1989
(Continued)

OTHER PUBLICATIONS

Deng et al, Reverse osmosis desalination of chitosan cross-linked graphene oxide/titania hybrid lamellar membranes, 2016 Nanotechnology 27 274002 (Year: 2016).*
(Continued)

*Primary Examiner* — Jason M Greene
*Assistant Examiner* — Eric J McCullough
(74) *Attorney, Agent, or Firm* — Wenderoth, Lind & Ponack, L.L.P.

(57) ABSTRACT

The objective of the present invention is to provide a composite separation membrane which is excellent in not only a liquid permeable performance and a separation performance relatively but also a durability and which is particularly useful as a membrane for liquid treatment, and a method for treating a liquid by using the composite separation membrane. The composite separation membrane according to the present invention is characterized in com-
(Continued)

prising a supporting base material and a complex layer, wherein the complex layer is placed on the supporting base material, the complex layer comprises oxidized metal nanosheets, graphene oxide and an alkanolamine, and at least one of the alkanolamine is present between the oxidized metal nanosheets.

13 Claims, 8 Drawing Sheets

(51) Int. Cl.
  *B01D 69/12* (2006.01)
  *B01D 69/14* (2006.01)
  *B01D 71/02* (2006.01)
(52) U.S. Cl.
  CPC ........ *B01D 71/024* (2013.01); *B01D 2323/36* (2013.01); *B01D 2325/02* (2013.01); *B01D 2325/16* (2013.01); *B01D 2325/20* (2013.01); *B01D 2325/24* (2013.01)

(56) References Cited

U.S. PATENT DOCUMENTS

| | | |
|---|---|---|
| 2012/0223017 A1 | 9/2012 | Park et al. |
| 2013/0284665 A1 | 10/2013 | Lee et al. |
| 2014/0208949 A1 | 7/2014 | Ishizuka et al. |
| 2014/0322443 A1 | 10/2014 | Lee et al. |
| 2015/0157989 A1 | 6/2015 | Kwon et al. |
| 2016/0354729 A1 | 12/2016 | Krishna et al. |
| 2017/0174537 A1 | 6/2017 | Zheng et al. |
| 2020/0017377 A1 | 1/2020 | Zheng et al. |

FOREIGN PATENT DOCUMENTS

| | | | |
|---|---|---|---|
| JP | 01-262902 | | 10/1989 |
| JP | 08-103631 | | 4/1996 |
| JP | 2007-70161 | | 3/2007 |
| JP | 2011-56390 | | 3/2011 |
| JP | 2011056390 A | * | 3/2011 |
| JP | 2012-517894 | | 8/2012 |
| JP | 2013-75264 | | 4/2013 |
| JP | 2014-501614 | | 1/2014 |
| JP | 2014-136669 | | 7/2014 |
| JP | 2015-112602 | | 6/2015 |
| JP | 2016-522737 | | 8/2016 |
| JP | 2016-159230 | | 9/2016 |
| WO | 2008/038524 | | 4/2008 |
| WO | 2017/106540 | | 6/2017 |

OTHER PUBLICATIONS

Nakagawa, Enhanced photocatalytic hydrogen evolution from water by niobate single molecular sheets and ensembles, Chem. Commun., 2014,50, 13702-13705 (Year: 2014).*
International Search Report dated Apr. 2, 2019 in International (PCT) Application No. PCT/JP2019/003016.
Huang et al., "Salt concentration, pH and pressure controlled separation of small molecules through lamellar graphene oxide membranes", Chem. Commun., 2013, vol. 49, pp. 5963-5965.
Sun et al., "Laminar $MoS_2$ membranes for molecule separation", Chem. Commun., 2013, vol. 49, pp. 10718-10720.
Deng et al., "Reverse osmosis desalination of chitosan cross-linked graphene oxide/titania hybrid lamellar membranes", Nanotechnology, vol. 27 (274002), 2016, pp. 1-8.

* cited by examiner

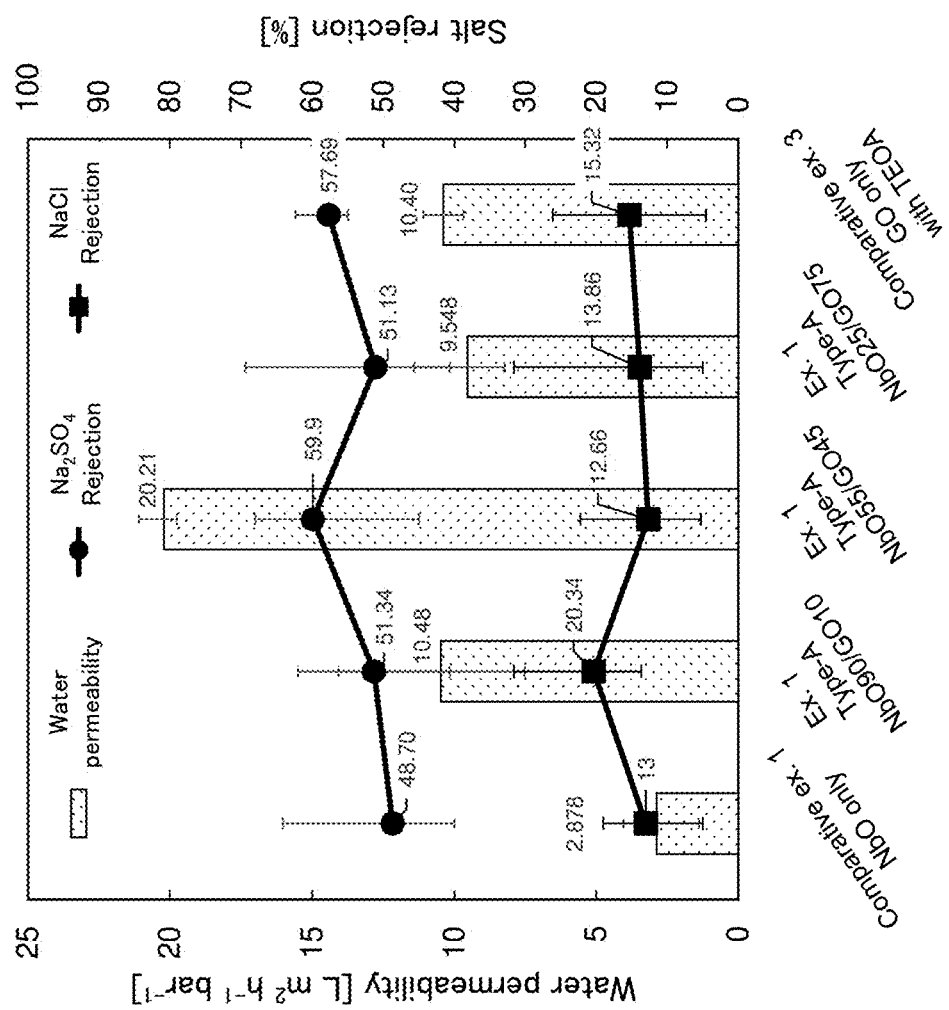
[Fig. 1]

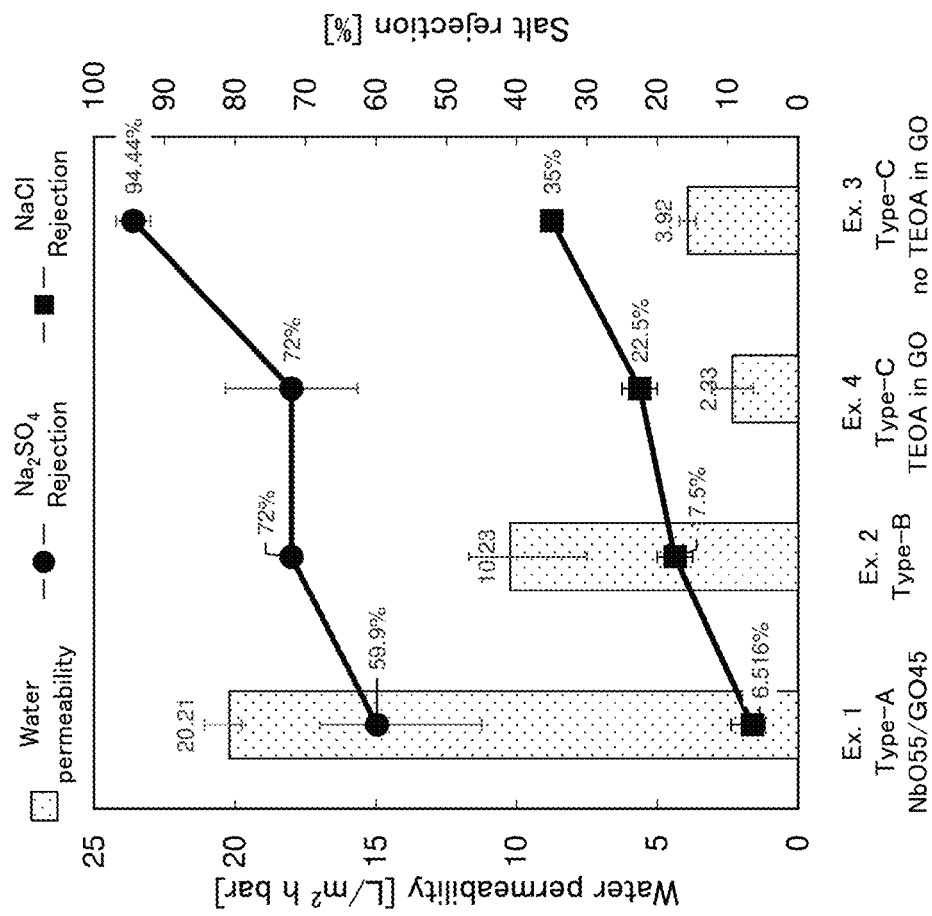
[Fig. 2]

[Fig. 3]
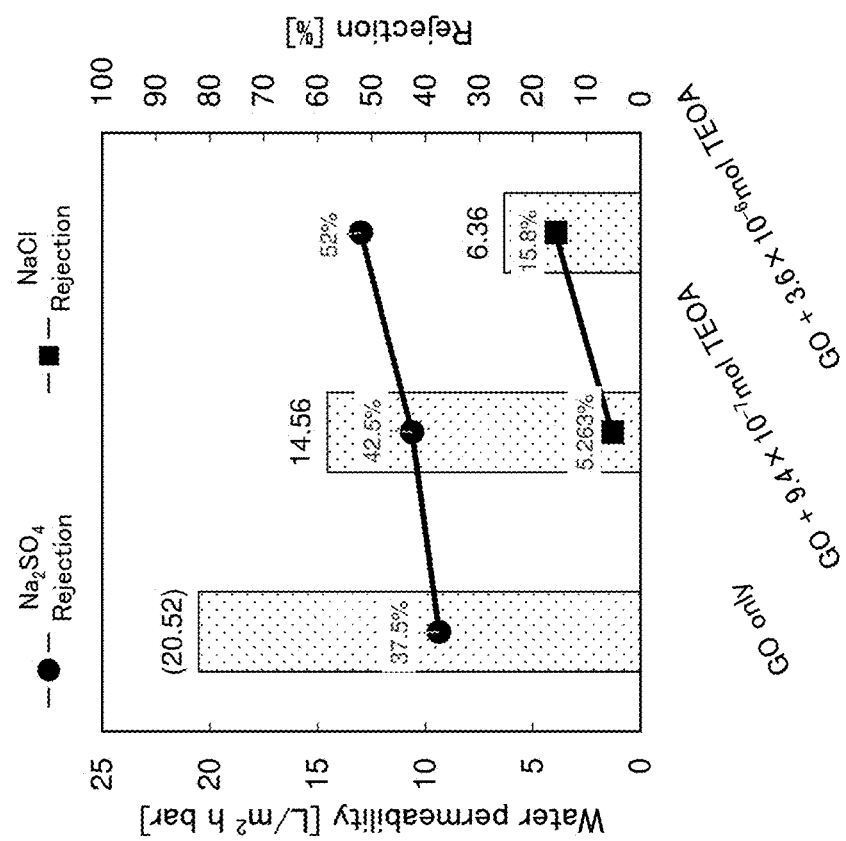

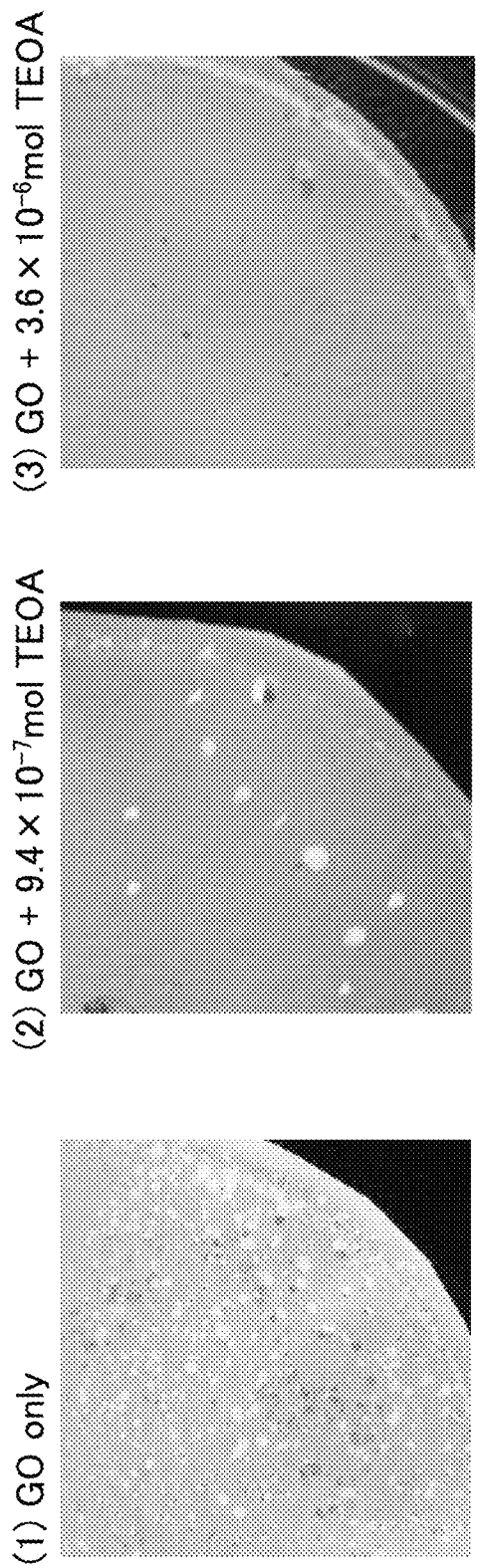

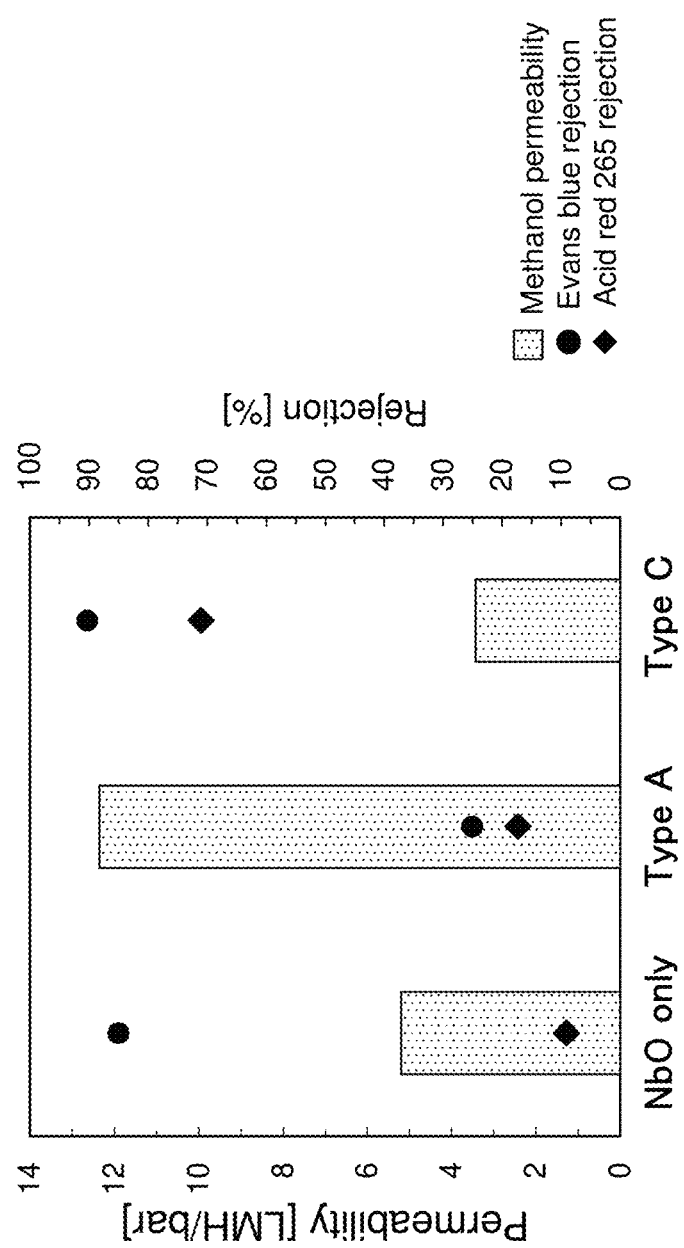
[Fig. 5]

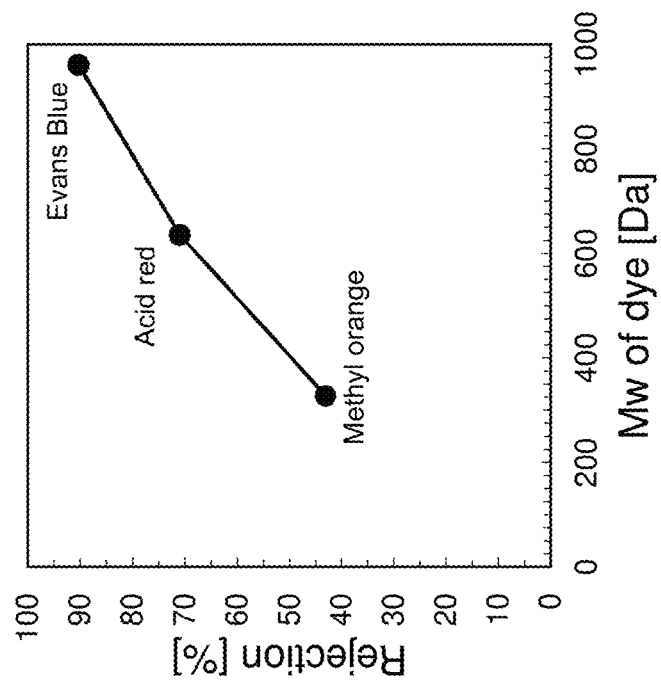
[Fig. 6]

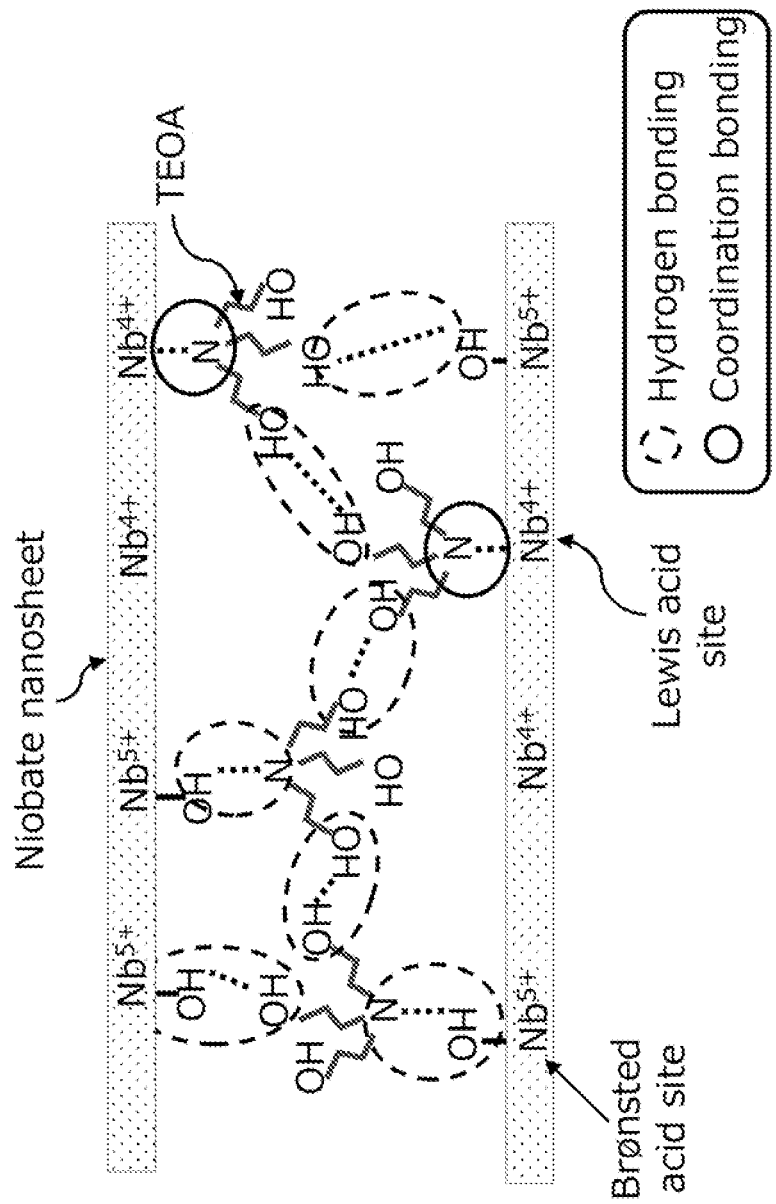
[Fig. 7]

[Fig. 8]
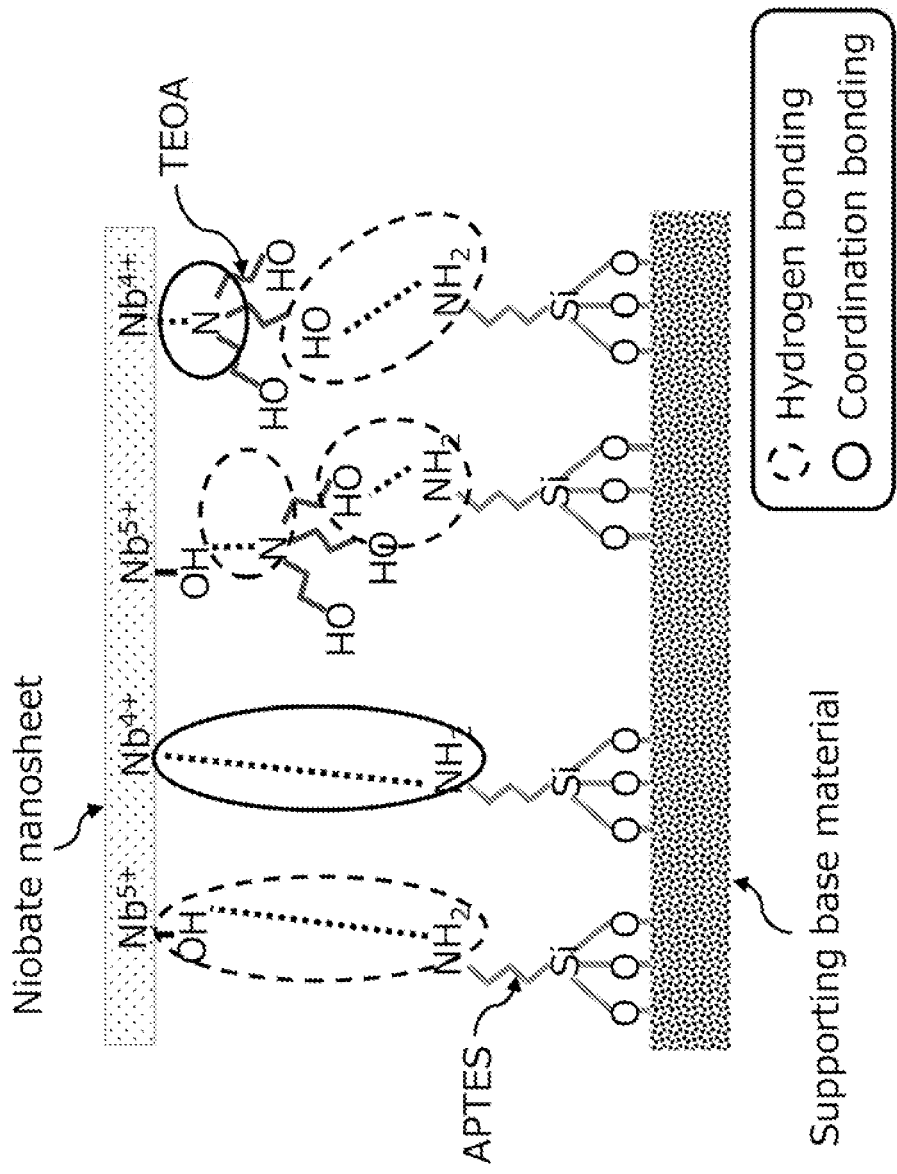

COMPOSITE SEPARATION MEMBRANE

TECHNICAL FIELD

The present invention relates to a composite separation membrane which is excellent in not only a liquid permeable performance and a separation performance relatively but also a durability and which is particularly useful as a membrane for liquid treatment, and a method for treating a liquid by using the composite separation membrane.

BACKGROUND ART

In recent years, it has been pointed out that agriculture may be hit by a large-scale water shortage in some regions due to intensifying natural disasters caused by global warming. On the one hand, water consumption is steadily increasing due to population growth. In addition, the spread of infectious diseases due to water pollution is also a problem in areas where a water purification facility is not adequately developed, such as African countries. Accordingly, various separation membranes usable for water purification have been developed.

Specifically, a separation membrane having a fine pore size by which particles and polymers smaller than 2 nm can be rejected is generally referred to as a nanofiltration membrane (NF membrane) and used for separating algae, mud, bacteria, virus or the like. The surface of a nanofiltration membrane is charged to give an electrostatic separation effect in some cases. For example, a minus charge is given to the surface of a nanofiltration membrane such that the transmission of an anion is rejected and a cation is adsorbed or the transmission of both of an anion and a cation is rejected.

When an organic solvent used in a factory or the like is discarded or treated, an insoluble component and a part of a solute are needed to be preliminarily reduced.

Various raw materials such as an organic material and an inorganic material are used as a raw material of a separation membrane, and an inorganic separation membrane is recently attracting attention in terms of a production cost and an applicability thereof to organic solvent treatment. For example, Patent document 1 discloses a separation membrane prepared by forming layered inorganic compound dispersion such as smectite powder into a membrane. Non-patent document 1 discloses a separation membrane prepared by laminating graphene oxide. Non-patent document 2 discloses a separation membrane prepared by laminating $MoS_2$ sheet. Non-patent document 3 discloses a separation membrane prepared by alternately laminating graphene oxide and titania.

PRIOR ART DOCUMENT

Patent Document

Patent Document 1: WO 2008/038524

Non-Patent Document

Non-patent Document 1: H. Huang, et al., Chem. Commun., 2013, vol. 49, p. 5963
Non-patent Document 2: L. Sun, et al., Chem. Commun., 2013, vol. 49, p. 10718
Non-patent Document 3: Hui Deng, et al., Nanotechnology, 2016, vol. 27, No. 27, p. 274002

DISCLOSURE OF THE INVENTION

Problems to be Solved by the Invention

Various inorganic separation membranes have been developed as described above, but the durability thereof is a problem. Specifically, a filtration method is mainly classified into dead end filtration method and cross flow filtration method. In dead end filtration method, flow directions of a liquid to be treated and a filtrate are the same, since the liquid is supplied to a separation membrane in an orthogonal direction. As a result, dead end filtration method is mainly used for treating a small amount of a sample and a separation membrane is basically disposable, since a solid component in a liquid to be treated deposits on the surface of the separation membrane. On the one hand, in cross flow filtration method, a liquid to be treated is supplied to a separation membrane in a parallel direction, and flow directions of a liquid to be treated and a filtrate are mutually orthogonal. As a result, cross flow filtration method is suitable for large scale treatment, since a solid component in a liquid to be treated does not deposit on the surface of the separation membrane and is discharged with a residual liquid. Cross flow filtration method, however, has a problem that a separation membrane is easily peeled from the surface, since a liquid to be treated is supplied to a separation membrane in a parallel direction.

For example, even when a separation membrane composed of graphene oxide is merely immersed into water, the separation membrane is swollen due to the spread of the interlayer and peeling occurs in a few days.

Accordingly, the objective of the present invention is to provide a composite separation membrane which is excellent in not only a liquid permeable performance and a separation performance relatively but also a durability and which is particularly useful as a membrane for liquid treatment, and a method for treating a liquid by using the composite separation membrane.

Means for Solving the Problems

The inventors of the present invention made extensive studies to solve the above problems. As a result, the inventors completed the present invention by finding that the complex layer containing oxidized metal nanosheets, graphene oxide and an alkanolamine is excellent in durability, since the alkanolamine may play a role to bind at least the oxidized metal nanosheets, and the complex layer is comparatively excellent in a liquid permeable performance and a separation performance, which performances are mutually opposed, due to the existence of both of relatively large graphene oxide and relatively small oxidized metal nanosheet.

Hereinafter, the present invention is described.

[1] A composite separation membrane,
comprising a supporting base material and a complex layer,
wherein the complex layer is placed on the supporting base material,
the complex layer comprises oxidized metal nanosheets, graphene oxide and an alkanolamine, and
at least one of the alkanolamine is present between the oxidized metal nanosheets.

[2] The composite separation membrane according to the above [1], wherein the oxidized metal nanosheets and the graphene oxide are mixed in the complex layer.

[3] The composite separation membrane according to the above [1], wherein the complex layer comprises a layer mainly comprising the graphene oxide and a layer mainly comprising the oxidized metal nanosheets.

[4] The composite separation membrane according to the above [3], wherein the layer mainly comprising the graphene oxide is placed on the supporting base material and the layer mainly comprising the oxidized metal nanosheets is placed thereon.

[5] The composite separation membrane according to the above [3], wherein the layer mainly comprising the oxidized metal nanosheets is placed on the supporting base material and the layer mainly comprising the graphene oxide is placed thereon.

[6] The composite separation membrane according to any one of the above [1] to [5], wherein the supporting base material has a hydroxy group at least on the surface, and a silane coupling agent having an ionic group is bound through the hydroxy group.

[7] The composite separation membrane according to any one of the above [1] to [6], wherein the alkanolamine is a trialkanolamine.

[8] The composite separation membrane according to any one of the above [1] to [7], wherein the oxidized metal nanosheets are composed of at least one of oxidized metal selected from the group consisting of an oxidized niobium, an oxidized titanium, an oxidized manganese, an oxidized zirconium, an oxidized tungsten, an oxidized molybdenum, an oxidized cobalt, an oxidized iron, an oxidized tantalum, an oxidized zinc, an oxidized germanium, an oxidized ruthenium and a complex oxidized metal.

[9] The composite separation membrane according to any one of the above [1] to [8], wherein the supporting base material is composed of an organic material or an inorganic material.

[10] The composite separation membrane according to any one of the above [1] to [9], wherein the supporting base material is composed of cellulose.

[11] The composite separation membrane according to any one of the above [1] to [10], wherein the supporting base material is a filter medium, a microfiltration membrane, an ultrafiltration membrane, a nanofiltration membrane or a reverse osmosis membrane.

[12] The composite separation membrane according to any one of the above [1] to [11], wherein the complex layer further comprises a cation.

[13] The composite separation membrane according to the above [12], wherein the cation is at least one kind of a cation selected from the group consisting of a proton, a metal ion, an ammonium ion and a cationic polymer.

[14] A method for treating a liquid, comprising the step of allowing the liquid to be treated to pass through the composite separation membrane according to any one of the above [1] to [13].

Effect of the Invention

The composite separation membrane of the present invention is excellent in durability, especially since the adhesiveness of oxidized metal nanosheets is improved due to an alkanolamine in the complex layer of the composite separation membrane according to the present invention. In addition, the complex layer of the composite separation membrane according to the present invention is composed of a combination of a relatively large graphene oxide and relatively small oxidized metal nanosheet, and both of the properties thereof are exhibited. Although a liquid permissible property of a layer containing an oxidized metal nanosheet in addition to graphene oxide generally tends to be lower than that of a layer composed of graphene oxide only, a liquid permissible property of a layer containing an oxidized metal nanosheet can be improved by devising the composition of the complex layer. In addition, a separation property, which is generally contrary to a liquid permissible property, can be improved without substantially lowering a liquid permissible property as the practicality is impaired. Thus, the composite separation membrane of the present invention is very useful and especially suitable for treating a liquid.

BRIEF DESCRIPTION OF THE DRAWINGS

FIG. 1 is a graph to demonstrate the result of water permissible property test and salt rejection property test of a separation membrane.

FIG. 2 is a graph to demonstrate the result of water permissible property test and salt rejection property test of a separation membrane.

FIG. 3 is a graph to demonstrate the result of water permissible property test and salt rejection property test of a separation membrane having a graphene oxide layer.

FIG. 4 are appearance photographs of separation membranes having a layer composed of graphene oxide only or a layer graphene oxide and triethanolamine after salt rejection property test.

FIG. 5 is a graph to demonstrate the result of water permissible property test and salt rejection property test of a separation membrane.

FIG. 6 is a graph to demonstrate the result of salt rejection property test of a separation membrane.

FIG. 7 illustrates an interaction between a nanosheet composed of niobate and triethanolamine (TEOA).

FIG. 8 illustrates an interaction between γ-aminopropyl-triethoxysilane (APTES) bound to the supporting base material and a niobate nanosheet or triethanolamine (TEOA).

MODE FOR CARRYING OUT THE INVENTION

The composite separation membrane of the present invention comprises a supporting base material and a complex layer. The supporting base material functions as a supporting layer for the complex layer. The complex layer is formed on the supporting base material and mainly functions as a separating layer.

The supporting base material is not particularly restricted as long as the supporting base material can support the complex layer and is porous. For example, a metal mesh filter, a filter paper, a woven fabric filter and a non-woven fabric filter can be used as the supporting base material. In addition, a general separation membrane such as a microfiltration membrane, an ultrafiltration membrane, a nanofiltration membrane and a reverse osmosis membrane can be also used as the supporting base material. The supporting base material is preferably porous in terms of the permission of a liquid to be treated. A pore diameter of the supporting base material is preferably 1 nm or more and more preferably 10 nm or more. The pore diameter is preferably 1 μm or less and more preferably 200 nm or less in terms of a stable lamination of the oxidized metal nanosheet constituting the complex layer. A thickness of the supporting base material is not particularly restricted and may be appropriately adjusted, and may be adjusted to 50 μm or more and 500 μm or less. When the thickness is 50 μm or more, the supporting base material may have sufficient strength. When the thickness is 500 μm or less, a handling property may be sufficiently ensured. A planar figure of the supporting base material may be appropriately determined depending on the embodiment of the composite separation membrane according to the present invention.

A raw material of the supporting base material is not particularly restricted and can be exemplified by an inorganic material and an organic material. An example of the inorganic raw material includes a ceramic raw material such as alumina, silica, alumina-silica, titania and zirconia; and a metal raw material such as iron steel and stainless steel. A ceramic raw material may be a complex oxide. An example of an organic material includes a polyolefin such as polyethylene and polypropylene; a polyester such as PET; a polyamide such as nylon 6 and nylon 6,6; a polyimide such as wholly aromatic polyimide; a polyketone such as an aliphatic polyketone and a wholly aromatic polyketone; a polycarbonate produced from Bisphenol A; a polysulfone such as polyether sulfone and sulfonated polyether sulfone; polyvinyl chloride; an acrylic resin; a fluorine resin such as polytetrafluoroethylene and polyvinylidene fluoride; a natural fiber such as cotton, wool and silk; a cellulose material such as cellulose, cellulose acetate, nitrocellulose and mixed cellulose ester; a recycled fiber such as rayon. The supporting base material may be composed of a combination of the above-described materials. In addition, the raw material of the supporting base material preferably has a hydroxy group on the surface for the treatment with a silane coupling agent described later. An example of such a raw material having a hydroxy group on the surface includes a ceramic material, a natural fiber, a cellulose material and a recycled fiber. When a solvent of a liquid to be treated is an organic solvent, a tolerant organic material such as polyamide, polyimide, polyketone and polytetrafluoroethylene in addition to an inorganic material is preferably used as the raw material of the supporting base material.

In the composite separation membrane of the present invention, the complex layer is placed on the supporting base material, the complex layer comprises oxidized metal nanosheets, graphene oxide and an alkanolamine, and the alkanolamine is present at least between the oxidized metal nanosheets. An oxidized metal constituting the oxidized metal nanosheet has a crystal structure containing at least a metal atom and an oxygen atom. The crystal structure spreads flat to form the sheet. For example, an oxidized niobium has a crystal structure containing a niobium atom and an oxygen atom. The oxidized metal nanosheet of the present invention is preferably composed of at least one of an oxidized metal selected from the group consisting of an oxidized niobium, an oxidized titanium, an oxidized manganese, an oxidized zirconium, an oxidized tungsten, an oxidized molybdenum, an oxidized cobalt, an oxidized iron, an oxidized tantalum, an oxidized zinc, an oxidized germanium, an oxidized ruthenium and a complex oxidized metal. An example of such a complex oxidized metal includes a complex oxidized material of 2 or more of the above-described oxidized metals and a perovskite. An example of the oxidized metal includes a metallic acid. An example of such a metallic acid includes at least one of metallic acids selected from the group consisting of niobate ($NbO_3^-$), orthotitanate ($TiO_4^{4-}$), metatitanate ($TiO_3^{2-}$), manganate ($MnO_4^{2-}$), zirconate ($ZrO_3^{2-}$), tungstate ($WO_4^{2-}$), molybdate ($MoO_4^{2-}$), cobaltate ($CoO_2^-$), ferrate ($FeO_4^{2-}$), tantalate ($TaO_3^-$), zincate ($ZnO_2^{2-}$), germanate ($GeO_3^{2-}$), ruthenate ($RuO_4^{2-}$) and perruthenate ($RuO_4^-$). The metallic acid may be a salt of an ion of alkaline earth metal such as lithium, potassium and sodium, and a salt of the group 2 element metal such as magnesium, calcium, strontium and barium. A crystal of a metallic acid salt formed by a coordination bonding between a metal ion and an oxide ion, and the electric potential of the whole crystal is zero. The crystal cannot be easily ionized unlike with a general salt and is represented as a complex of an oxidized metal and an alkaline earth metal or the group 2 element metal. For example, a crystal of lithium niobite is a complex oxide composed by 1:1 composition of lithium oxide $Li_2O$ and niobium oxide $Nb_2O_5$. The oxidized metal nanosheet may be composed of only one kind of metal atom or a plurality of kinds of metal atoms. The oxidized metal nanosheet is preferably composed of an oxidized niobium and/or an oxidized titanium, and is preferably composed of an oxidized niobium among the above examples. In such a case, an oxidized niobium and/or an oxidized titanium is preferably contained in the oxidized metal nanosheet as a main component. Specifically, it is preferred that 60 mol % or more of the metal atom constituting the oxidized metal nanosheet is niobium and/or titanium. The ratio is more preferably 75 mol % or more, and even more preferably 90 mol % or more. It goes without saying that all of the metal atom constituting the oxidized metal nanosheet may be niobium and/or titanium.

A thickness of one layer of the oxidized metal nanosheet is generally about 0.5 nm or more and about 1.5 nm or less. A length of the oxidized metal nanosheet is preferably, for example, 50 nm or more, and more preferably 100 nm or more. The upper limit of the length of the oxidized metal nanosheet is not particularly restricted, and the length may be, for example, 1 μm or less, preferably 500 nm or less, and more preferably 300 nm or less. For example, a thickness of niobate nanosheet is 0.9 nm, and a length thereof in a planar direction is about 100 nm or more and about 300 nm or less (NAKAGAWA Keizo, et al., Chem. Commun., 2014, vol. 50, pp. 13702-13705). The thickness and length of the oxidized metal nanosheet may be measured by using an electron microscope, an atomic force microscope or the like.

Graphene oxide is prepared by oxidizing graphene with an oxidizing agent such as potassium permanganate and hydrogen peroxide, and has a hydroxy group, a carboxy group, an epoxy group or the like. Graphene corresponds to each layer constituting graphite. A thickness of graphene oxide is 0.796 nm, and a length in a planer direction is about 4000 nm or more and about 6000 nm or less (Juanni Chen, et al., Nanoscale, 2014, vol. 6, pp. 1879-1889). Hereinafter, both of the oxidized metal nanosheet and graphene oxide are simply described as "nanosheet" in some cases.

The complex layer preferably further has a cation. A stability of the complex layer is improved due to the presence of a counter cation, since graphene oxide has a carboxy group. The cation may compose a part of a crystal of the oxidized metal or may be placed between the oxidized metal nanosheet layers or the graphene oxide layers like a general layered compound. A distance between the oxidized metal nanosheets or the graphene oxides can be changed by selecting the kind of the cation existing therebetween; as a result, a nominal pore size of the composite separation membrane can be changed. The nominal pore size in this disclosure means a size of pores exerting a separation property.

An example of the cation contained in the complex layer includes a proton, a metal ion, an ammonium ion, a cationic polymer and other cationic compound. For example, when the cation is an ammonium ion, ammonia is preferably used during the production of the oxidized metal nanosheet by the production method described later, since the hydrolysis and dehydration condensation reaction of a metal alkoxide compound can be controlled and thus a production of the oxidized metal nanosheet laminate containing a cation becomes easy. In addition, when the cation is an ammonium ion, a distance between layers of the oxidized metal nanosheet laminate can be narrower.

When the cation contained in the complex layer is a metal ion or a cationic polymer, a distance between layers of the oxidized metal nanosheets can be broader. The metal ion and cationic polymer in such a case may function as a binder between the oxidized metal nanosheet layers.

The cationic polymer is not particularly restricted as long as the polymer has a cationic group. An example of the cationic group includes an amino group, an ammonium salt group and an imino group. A main chain structure of the polymer is not also particularly restricted. An example of the cationic polymer to be used includes polyethylenimine, poly(diallyldimethylammonium chloride), poly(allylamine hydrochloride), polylysine and chitosan.

The metal ion is not particularly restricted and is exemplified by a metal ion of the group 1 element such as lithium, sodium and potassium; a metal ion of the group 2 element such as magnesium, calcium and barium; an ion of a transition metal such as nickel and platinum; a metal ion of the group 12 element such as zinc and cadmium; a metal ion of the group 13 element such as aluminum, gallium and indium; a metal ion of the group 14 element such as germanium and tin; a metal ion of the group 15 element such as antimony and bismuth; and a metal ion of the group 16 element such as tellurium. The cation contained in the complex layer is preferably a proton; an alkali metal ion such as lithium ion, sodium ion and potassium ion; magnesium ion; an alkaline earth metal ion such as calcium ion, strontium ion and barium ion. The cation which constitutes the oxidized metal nanosheet may be only one kind of the cation or a plurality of kinds of the cations.

A distance of the layers of the oxidized metal nanosheet and graphene oxide can be measured by X-ray diffraction. For example, a layered product composed of niobate nanosheet only containing triethanolamine and an ammonium ion has an interlayer distance of 1.01 nm; on the one hand, an interlayer distance of a niobate nanosheet layered product containing triethanolamine and poly(diallyldimethylammonium chloride) becomes 2.05 nm, and an interlayer distance of a niobate nanosheet layered product containing triethanolamine and an aluminum ion becomes 1.19 nm. Thus, an interlayer distance of the oxidized metal nanosheets or graphene oxides in the composite separation membrane of the present invention can be adjusted to, for example, 0.5 nm or more and 5.0 nm or less by appropriately selecting the kinds of the alkanolamine and the cation.

The alkanolamine has an amino group and a hydroxy group. As illustrated in FIG. 7, the amine may interact with a metal ion or a hydroxy group in the oxidized metal nanosheet, and the hydroxy group may bind to a hydroxy group of the oxidized metal nanosheet by a hydrogen bonding. The hydroxy groups in the alkanolamine may bind to each other by a hydrogen bonding in some cases. In addition, the alkanolamine may contribute the stability of the complex layer by interacting with a carboxy group and a hydroxy group in graphene oxide. In FIG. 7, an interaction between a nanosheet composed of niobate and triethanolamine (TEOA) is representatively shown.

In the complex layer of the composite separation membrane according to the present invention, there is an alkanolamine between the oxidized metal nanosheets, between graphene oxides, and between the oxidized metal nanosheet and graphene oxide; as a result, a distance between layers is stabilized. It has been known that some molecules placed between the layers of a layered compound such as an oxidized metal nanosheet layered product act to increase a distance between the layers; on the one hand, it was found by the inventors of the present invention that the complex layer prepared from the oxidized metal nanosheet, graphene oxide and the alkanolamine has high adhesiveness between the nanosheets and stability. The alkanolamine may coordinately bind to the oxidized metal nanosheet and the like. For example, the alkanolamine may act as a binder to bind adjacent nanosheets by forming a hydrogen bonding with a hydroxy group on the surface of the oxidized-metal nanosheet and graphene oxide, and by forming a hydrogen bonding with the alkanolamine coordinately bound to the oxidized metal nanosheet. Thus, the complex layer of the composite separation membrane according to the present invention has a very fine pore formed depending on a distance of layers of the nanosheet constituting the complex layer. The connection between the nanosheets is strong. Accordingly, the composite separation membrane of the present invention has an excellent stability and separation property corresponding to that of, for example, an ultrafiltration membrane and a nanofiltration membrane.

The alkanolamine is not particularly restricted as long as the alkanolamine has a structure in which a hydroxyalkyl group is bound to a nitrogen atom. Only one, two or three of hydroxyalkyl groups may bind to a nitrogen atom. For example, the amine represented by the following formula (I) can be used as the alkanolamine. In the following formula (I), $R^1$ is a hydroxyalkyl group, and $R^2$ and $R^3$ are independently a hydroxyalkyl group, an alkyl group or a hydrogen atom.

$$NR^1R^2R^3 \qquad (I)$$

The hydroxyalkyl group contained in the alkanolamine is preferably linear or branched and more preferably linear. The number of the carbon atom thereof is preferably 1 or more and 6 or less, more preferably 1 or more and 4 or less, and even more preferably 1 or more and 3 or less. When such an alkanolamine is used, it becomes easy to adjust a distance between nanosheet layers to be narrow. When di- or trialkanolamine in which 2 or 3 hydroxyalkyl groups are bound to a nitrogen atom is used, a plurality of hydroxyalkyl groups may be the same as or different from each other. The hydroxy group of the hydroxyalkyl group preferably binds to the end of the alkyl group, in other words, the farthest side from the nitrogen atom.

When the alkanolamine has an alkyl group, the alkyl group is preferably linear or branched and more preferably linear. The number of the carbon atom is preferably 1 or more and 6 or less, more preferably 1 or more and 4 or less, and even more preferably 1 or more and 3 or less.

An example of the alkanolamine includes a monoalkanolamine such as methanolamine, ethanolamine, propanolamine, N-methylethanolamine, N-butylethanolamine, N,N-dimethylethanolamine, N,N-diethylethanolamine, N,N-dibutylethanolamine and N,N-dimethylpropanolamine; a dialkanolamine such as dimethanolamine, diethanolamine, N-methyldiethanolamine and 2-[(hydroxymethyl)amino]ethanol; a trialkanolamine such as trimethanolamine, triethanolamine, tripropanolamine and 2-[di(hydroxymethyl)amino]ethanol.

As the alkanolamine, dialkanolamine or trialkanolamine is preferably used and trialkanolamine is more preferably used. When such an alkanolamine is used, the adhesiveness between nanosheets is increased, since there is a plurality of hydroxy groups in one molecule. In particular, when a trialkanolamine is used, the nanosheets are densely layered without difficulty. An example of trialkanolamine includes triethanolamine and triisopropanolamine.

The alkanolamine is particularly preferably placed between the oxidized metal nanosheet layers in the complex layer. When the alkanolamine is thus placed, the adhesiveness of each oxidized metal nanosheet is increased. As a result, not only fine pores are easily formed but also the durability of the complex layer, particularly peeling resistance, can be improved. Even in such a case, a part of the oxidized metal nanosheets may be layered without the alkanolamine between the layers as long as the complex layer performs the desired function.

The complex layer of the composite separation membrane according to the present invention is mainly classified into the following three types.

1. Type-A Composite Separation Membrane

The oxidized metal nanosheet and graphene oxide are mixed in the complex layer of Type-A composite separation membrane. There is the alkanolamine all of between the oxidized metal nanosheets, between graphene oxides, and between the oxidized metal nanosheet and graphene oxide.

The liquid permissible property and the separation property of the composite separation membrane may be adjusted by adjusting a ratio of the oxidized metal nanosheet and graphene oxide in the complex layer of Type-A composite separation membrane. For example, when the oxidized metal nanosheet and graphene oxide are mixed, the liquid permissible property is improved in comparison with a layer composed of the oxidized metal nanosheet only but the liquid permissible property tends to be lowered in comparison with a layer composed of graphene oxide only. The liquid permissible property, however, is improved even in comparison with a layer composed of graphene oxide only by adjusting a ratio of the oxidized metal nanosheet to the total of the oxidized metal nanosheet and graphene oxide to 40 mass % or more and 60 mass % or less. In addition, the separation property is similar or improved in comparison with a layer composed of the oxidized metal nanosheet only or graphene oxide only by adjusting a ratio of the oxidized metal nanosheet to the total of the oxidized metal nanosheet and graphene oxide to 40 mass % or more and 95 mass % or less, preferably 75 mass % or more.

2. Type-B Composite Separation Membrane

Type-B composite separation membrane is prepared by laminating a layer mainly composed of graphene oxide on the supporting base material, and laminating a layer mainly composed of the oxidized metal nanosheet thereon to form two layered complex layer. Hereinafter, a layer mainly composed of graphene oxide is referred to as "graphene oxide layer", and a layer mainly composed of the oxidized metal nanosheet is referred to as "oxidized metal nanosheet layer" in some cases. Type-B composite separation membrane is prepared by forming the graphene oxide layer on the supporting base material and then forming the oxidized metal nanosheet layer thereon as described later. Thus, the oxidized metal nanosheet may enter into the graphene oxide layer, and the alkanolamine may exist not only between the oxidized metal nanosheets but also between graphene oxides and between the oxidized metal nanosheet and graphene oxide. Type-B composite separation membrane tends to have lower liquid permissible property but higher separation property in comparison with Type-A composite separation membrane, presumably since Type-B composite separation membrane easily exerts the separation property due to the oxidized metal nanosheet and the separation property due to graphene oxide respectively.

A ratio of the oxidized metal nanosheet to a total of the oxidized metal nanosheet and graphene oxide in the graphene oxide layer of Type-B composite separation membrane may be adjusted to 20 mass % or less, 10 mass % or less, or 5 mass % or less. A ratio of the oxidized metal nanosheet to a total of the oxidized metal nanosheet and graphene oxide in the oxidized metal nanosheet layer may be adjusted to 90 mass % or more, 95 mass % or more, or 98 mass % or more.

Ratios of the oxidized metal nanosheet and graphene oxide in the complex layer of Type-B composite separation membrane may be adjusted similarly to each ratio in the complex layer of Type-A composite separation membrane.

3. Type-C Composite Separation Membrane

Type-C composite separation membrane is prepared by laminating a layer mainly composed of oxidized metal nanosheet, i.e. the oxidized metal nanosheet layer, on the supporting base material, and laminating a layer mainly composed of graphene oxide, i.e. the graphene oxide layer, thereon to form two layered complex layer. The alkanolamine may be or may not be intendedly mixed into the graphene oxide layer. When the alkanolamine is mixed into the graphene oxide layer, the graphene oxide layer is stabilized and the durability thereof is improved. On the one hand, when the alkanolamine is not mixed into the graphene oxide layer, the separation property improved presumably due to a negative potential derived from the carboxy group on graphene oxide.

A ratio of graphene oxide to a total of the oxidized metal nanosheet and graphene oxide in the oxidized metal nanosheet layer of Type-C composite separation membrane may be adjusted to 10 mass % or less, 5 mass % or less, or 2 mass % or less. A ratio of the oxidized metal nanosheet to a total of the oxidized metal nanosheet and graphene oxide in the graphene oxide layer may be adjusted to 10 mass % or less, 5 mass % or less, or 2 mass % or less.

Ratios of the oxidized metal nanosheet and graphene oxide in the complex layer of Type-C composite separation membrane may be adjusted similarly to each ratio of the complex layer of Type-A composite separation membrane.

Since it is difficult to accurately measure a ratio of the oxidized metal nanosheet or graphene oxide to a total of the oxidized metal nanosheet and graphene oxide in each layer of Type-B composite separation membrane and Type-C composite separation membrane, the ratio is determined based on the ratio of each total area of the oxidized metal nanosheet and graphene oxide in a magnified photograph of a cross-section surface of the complex layer.

A thickness of the complex layer is not particularly restricted and may be determined so that the desired liquid permissible property and separation property can be exhibited. Since a thickness of the one layer of the oxidized metal nanosheet is very thin as described above, the desired separation property of the composite separation membrane according to the present invention can be exerted with adjusting a thickness of the complex layer to mainly exhibit separation property to be thin. The thickness of the complex layer is preferably, for example, 10 nm or more, more preferably 15 nm or more, and preferably 1 µm or less, 800 nm or less, or 600 nm or less, and more preferably 400 nm or less, 200 nm or less, or 100 nm or less. The thickness of the complex layer can be determined by, for example, carrying out magnified observation of the cross section of the composite separation membrane according to the present invention with using a scanning electron microscope (SEM), measuring a thickness of the layered product at the three parts of the both ends and the central part in the magnified photograph, and calculating an average value thereof as the thickness.

The supporting base material may be treated with a silane coupling agent. The silane coupling agent may improve the adhesiveness between the supporting base material and the complex layer by binding to the surface of the supporting base material and chemically binding the active group thereof to the hydroxy group of the oxidized metal nanosheet and graphene oxide and the alkanolamine as illustrated in FIG. 8. The interaction between γ-aminopropyltriethoxysilane (APTES) bound to the supporting base material and a niobate nanosheet or triethanolamine (TEOA) is representatively shown in FIG. 8.

As the silane coupling agent, for example, a silane coupling agent represented by the following formula (II) can be used. In the following formula (II), $R^4$, $R^5$ and $R^6$ are independently a $C_{1-4}$ alkoxy group, particularly a $C_{1-2}$ alkoxy group; a $C_{1-4}$ alkanoyl group, particularly a $C_{1-2}$ alkanoyl group; or a halogeno group selected from chloro group, bromo group and iodo group, and $R^7$ is a $C_{1-4}$ alkylene group substituted with an active group. The active group is not particularly restricted as long as the active group can form a chemical bond with a hydroxy group, and is exemplified by an amino group, a quaternary ammonium group, an epoxy group and a mercapto group.

$$R^4R^5R^6SiR^7 \qquad (II)$$

Specifically, an amino group-containing silane coupling agent, a quaternary ammonium group-containing silane coupling agent, an epoxy group-containing silane coupling agent, a mercapto group-containing silane coupling agent may be used. When the silane coupling agents are used, an amino group, a quaternary ammonium group, an epoxy group and a mercapto group contained in the silane coupling agents interact with the oxidized metal nanosheet and the supporting base material to improve the adhesiveness between the oxidized metal nanosheet and the supporting base material. An example of the amino group-containing group contained in the silane coupling agent includes 3-aminopropyl group, 3-(2-aminoethyl)aminopropyl group, 3-(6-aminohexyl)aminopropyl group, 3-(N,N-dimethylamino)propyl group, N-phenylaminomethyl group, N-phenyl-3-aminopropyl group, N-benzyl-3-aminopropyl group and N-cyclohexylaminomethyl group. An example of the quaternary ammonium group includes trimethylammoniumpropyl group, trimethylammoniumbenzyl group, tetradecyldimethylammoniumpropyl group and octadecyldimethylammoniumpropyl group. An example of the epoxy-containing group includes glycidoxy group, 3-glycidoxypropyl, 8-(glycidoxy)-n-octyl group, 3,4-epoxycyclohexyl group and 2-(3,4-epoxycyclhexyl)ethyl group. An example of the mercapto-containing group includes 3-mercaptopropyl group, 2-mercaptoethyl group, 2-mercaptopropyl group and 6-mercaptohexyl group. The silane coupling agent in which the above-described group is bound to the silicon atom as a reactive functional group and in which an alkoxy group, an acetoxy group or a halogeno group is additionally bound to the silicon atom as a hydrolyzable group can be used. In particular, an amino group-containing silane coupling agent is preferably used as the silane coupling agent.

A general usable method for the treatment of the supporting base material with the silane coupling agent, such as dipping method, coating method and gas phase reaction method, can be used. A raw material of the supporting base material is formed to be usable as the supporting base material, for example, as a sheet, and then may be treated with the silane coupling agent; or a raw material before being formed as the supporting base material may be treated with the silane coupling agent.

The composite separation membrane of the present invention can be applied to a general use application, such as ultrafiltration membrane, nano filtration membrane, reverse osmosis membrane and forward osmosis membrane. For example, the composite separation membrane can be used for wasterwater treatment, waste liquid treatment, water purifying treatment, beverage production, separation and recovery of useful substance, and separation and removal of bacteria and virus. Also, the composite separation membrane can be used for molecular sieve and the application for gas-solid separation such as air cleaning filter.

Since the complex layer exhibiting separation capacity in the composite separation membrane of the present invention is composed of an inorganic compound, the composite separation membrane can be applied to the treatment for not only water but also an organic solvent. A conventional separation membrane containing an inorganic compound layer has low durability; on the one hand, since the composite separation membrane of the present invention has excellent durability, the composite separation membrane can be also applied to cross flow filtration method. Thus, the composite separation membrane of the present invention can be used for the treatment of not only water but also an organic solvent. In addition, the composite separation membrane can be also used for the treatment of a large amount of water and an organic solvent.

An organic solvent which can be treated by the composite separation membrane of the present invention is not particularly restricted, and is exemplified by a $C_{1-6}$ alcohol such as methanol, ethanol and isopropanol; an ether solvent such as diethyl ether, tetrahydrofuran and tetrahydropyran; a ketone solvent such as acetone and methyl ethyl ketone; an aliphatic hydrocarbon solvent such as n-hexane and n-heptane; a halogenated hydrocarbon solvent such as dichloromethane, chloroform, carbon tetrachloride and chlorobenzene; an aromatic hydrocarbon solvent such as benzene and toluene; an amide solvent such as dimethylformamide and dimethylacetoamide; a sulfoxide solvent such as dimethylsulfoxide.

When an organic solvent having a large molecular weight is treated, it is preferred to adjust the pore diameter of the complex layer to be relatively large. When an organic solvent which is a solid or has high viscosity under ordinary temperature and ordinary pressure is treated, the organic solvent to be treated may be heated.

The composite separation membrane of the present invention can be produced by the method comprising:

Step a: a metal alkoxide compound is heated in the presence of an alkanolamine to obtain an oxidized metal nanosheet colloid solution containing the alkanolamine;

Step b: a graphene oxide colloid solution is obtained;

Step c: the oxidized metal nanosheet colloid solution and the graphene oxide colloid solution are filtered with a supporting base material to deposit the oxidized metal nanosheet and the graphene oxide on the supporting base material.

In Step a, a metal alkoxide compound as a raw material of the oxidized metal nanosheet, such as a niobium alkoxide compound and a titanium alkoxide compound, is heated in an aqueous solvent in the presence of an alkanolamine to condensate the metal alkoxide compound. In Step a, the metal alkoxide is hydrolyzed and condensated by dehydration to form a network in which a metal atom and an oxygen atom are alternately bound. When the alkanolamine is coexistent at the time, the network of a metal atom and an oxygen atom spreads in a plane direction. An example of the aqueous solvent includes water and a mixed solvent of water and a water-miscible organic solvent such as methanol and ethanol.

The "colloid solution" means a dispersion in which a sediment cannot be found in this disclosure, since the oxidized metal nanosheet and graphene oxide are basically insoluble.

It is preferred to use at least one metal alkoxide compound selected from the group essentially consisting of a niobium alkoxide compound, a titanium alkoxide compound, a manganese alkoxide compound, a zirconium alkoxide compound, a tungsten alkoxide compound, a molybdenum alkoxide compound, a cobalt alkoxide compound, an iron alkoxide compound, a tantalum alkoxide compound and a ruthenium alkoxide compound. At least one of the alkoxy group may be bound to the metal atom. An example of the alkoxy group includes a $C_{1-4}$ alkoxy group such as methoxy, ethoxy, n-propoxy, isopropoxy and n-butyl. The metal atom of the metal alkoxide compound may be bound by an alkyl group, an aminoalkyl group, an alkanoyl group, an alkanoyloxy group or the like of which number of the carbon is preferably 1 or more and 4 or less.

A usage amount of the metal alkoxide compound may be appropriately adjusted and for example, a concentration of the oxidized metal nanosheet in the oxidized metal nanosheet colloid solution may be adjusted to about 0.5 µg/mL or more and about 20 µg/mL or less.

The above-described alkanolamine can be used as the alkanolamine, dialkanolamine or trialkanolamine are preferably used, and trialkanolamine is more preferably used. The alkanolamine acts to inhibit an excess hydrolysis reaction or an excess condensation reaction of the metal alkoxide compound in the reaction step. As a result, it becomes easy to obtain a monolayer oxidized metal nanosheet by using the alkanolamine. Also, the alkanolamine acts to increase the adhesiveness between the nanosheets in the subsequent lamination step. About 1 time by mole or more and about 6 times by mole or less of the alkanolamine to the metal alkoxide compound may be used. Ammonia is preferably used in addition to the alkanolamine in order to inhibit the condensation reaction of the metal alkoxide compound.

It is preferred to carry out the reaction of the metal alkoxide compound in the liquid mixture containing the alkanolamine and further an ammonium ion in the presence of water. The reaction is preferably carried out as a hydrothermal reaction, and a condition thereof may be appropriately adjusted. For example, a reaction temperature may be usually adjusted to about 100° C. or higher and about 250° C. or lower. The reaction temperature may be increased continuously or gradually. A pressure may be a vapor pressure of the solvent. The reaction is preferably performed in a sealed vessel. A reaction time may be adjusted to about 10 hours or more and about 150 hours or less.

A dispersion of the oxidized metal nanosheet can be obtained by reacting the metal alkoxide compound in the presence of at least the alkanolamine and water. The dispersion is obtained as, for example, a colloid solution of the oxidized metal nanosheet. On the surface of the thus obtained oxidized metal nanosheet, the alkanolamine may be bound by coordination bonding and a cation may be adhered by an electrostatical interaction.

In Step b, a colloid solution of graphene oxide is obtained. Specifically, for example, a graphite powder is oxidized to obtain graphene oxide, a solid component is removed from the reaction mixture by centrifugation, filtration or the like, and washing water is added. The procedure is repeated to obtain a colloid solution of graphene oxide. An example of such a washing liquid includes water such as ultrapure water, an alcohol solvent such as ethanol, and hydrochloric acid. Finally, graphene oxide colloid is dispersed in ultrapure water. The alkanolamine may be also added to the graphene oxide colloid solution in order to stabilize the layer containing graphene oxide similarly to the oxidized metal nanosheet colloid solution.

A concentration of graphene oxide in the graphene oxide colloid solution may be appropriately adjusted and may be adjusted to, for example, about 0.5 µg/mL or more and about 20 µg/mL or less.

In Step c, the complex layer is formed by laminating the oxidized metal nanosheet and graphene oxide obtained in the above reaction steps on the supporting base material in order to obtain the composite separation membrane. Specifically, in order to obtain Type-A composite separation membrane, the oxidized metal nanosheet colloid solution obtained in Step a and the graphene oxide colloid solution obtained in Step b are mixed and the thus obtained mixed liquid is filtered by using the supporting base material to form the complex layer containing a mixture of the oxidized metal nanosheet and graphene oxide on the supporting base material. Since the above-described mixed liquid contains the alkanolamine, the alkanolamine may be present between the oxidized metal nanosheets, between graphene oxides and between the oxidized metal nanosheet and graphene oxide in Type-A composite separation membrane.

In order to obtain Type-B composite separation membrane, the graphene oxide colloid solution obtained in Step b is first filtered by using the supporting base material in order to form a layer containing mainly graphene oxide on the supporting base material, and then the oxidized metal nanosheet colloid solution obtained in Step a is poured on the graphene oxide layer to be filtered in order to form a layer containing mainly the oxidized metal nanosheet on the graphene oxide layer. In this case, the alkanolamine may be present not only between the oxidized metal nanosheets but also between graphene oxides and between the oxidized metal nanosheet and graphene oxide in the complex layer of Type-B composite separation membrane, since the oxidized metal nanosheet colloid solution contains the alkanolamine. Also, a part of the oxidized metal nanosheet may be present in a void of the graphene oxide layer, since the oxidized metal nanosheet is generally smaller than graphene oxide.

In order to obtain Type-C composite separation membrane, the oxidized metal nanosheet colloid solution obtained in Step a is first filtrated by using the supporting base material in order to form a layer containing mainly oxidized metal nanosheet on the supporting base material, and then the graphene oxide colloid solution is poured on the oxidized metal nanosheet layer to be filtered in order to form a layer containing mainly graphene oxide on the oxidized metal nanosheet layer. In this case, when the alkanolamine is added to the graphene oxide colloid solution, the alkanolamine may be present not only between the oxidized metal nanosheets but also between graphene oxides and between the oxidized metal nanosheet and graphene oxide in the complex layer of Type-C composite separation membrane. On the one hand, when the alkanolamine is not added to the graphene oxide colloid solution, even if the alkanolamine is present between the oxidized metal nanosheet and graphene oxide, the alkanolamine may not be present between graphene oxides in the graphene oxide layer unless an alkanolamine solution is additionally added. Though graphene oxide is generally larger than the oxidized metal nanosheet, a part of graphene oxide may be possibly present in a void of the oxidized metal nanosheet layer.

When a cation is added to at least one of the oxidized metal nanosheet colloid solution and the graphene oxide colloid solution, the cation may be present in the complex layer. An example of the cation added to the colloid solution includes an ammonium ion, a metal ion and a cationic polymer as described above.

The colloid solution may be filtered by using the supporting base material in order to laminate the complex layer on the supporting base material by allowing the colloid solution to pass through the supporting base material. The filtration may be either dead end filtration or cross flow filtration. If needed, a pressure of a primary side may be increased and a pressure of a secondary side may be reduced. The primary side means a side on which the complex layer is laminated, and the secondary side means an opposite side of the side on which the complex layer is laminated. A thickness of the complex layer formed on the supporting base material can be adjusted by adjusting a concentrations of the oxidized metal nanosheet and graphene oxide in the colloid solutions and an amount of the colloid solutions. It is preferred to continue a suction for, for example, 15 minutes or more and 12 hours or less by reducing a pressure of a secondary side without further providing the colloid solution after the colloid solution is filtered by using the supporting base material in order to increase an adhesiveness between the layers in the complex layer.

The supporting base material may be preliminarily treated with a surfactant, a polymer electrolyte or the like in addition to the above-described silane coupling agent in order to further increase the adhesiveness between the supporting base material and the complex layer. In such a case, the substances act as a binder between the supporting base material and the complex layer.

A cationic surfactant can be used as the above-described surfactant. An example of the cationic surfactant includes an alkylated quaternary ammonium salt such as octyltrimethylammonium chloride, decyltrimethylammonium chloride, dodecyltrimethylammonium chloride, tetradecyltrimethylammonium chloride, cetyltrimethylammonium chloride, stearyltrimethylammonium chloride, cetyltrimethylammonium bromide, didecyldimethylammonium chloride and distearyldimethylammonium chloride. A dipping method, a coating method or the like can be used for the treatment with the surfactant.

A cationic polymer can be used as a polymer electrolyte. An example of the cationic polymer includes poly(diallyldimethylammonium chloride), polyethylenimine, polyallylamine, polylysine and chitosan. A dipping method, a coating method or the like can be used for the treatment with the polymer electrolyte.

A distance between the oxidized metal nanosheets, between graphene oxides and/or between the oxidized metal nanosheet and graphene oxide in the complex layer can be adjusted by further contacting the composite separation membrane produced by the above-described method with a cation. When the composite separation membrane is contacted with a cation-containing liquid, the cation in the cation-containing liquid may enter into the nanosheets in the complex layer and thus a distance between the nanosheets can be changed. The cation which is contacted with the composite separation membrane is preferably a cation other than the cation contained in the composite separation membrane obtained in Step c. An example of the cation includes a metal ion and a cationic polymer described above.

The present application claims the benefit of the priority date of Japanese patent application No. 2018-20508 filed on Feb. 7, 2018. All of the contents of the Japanese patent application No. 2018-20508 filed on Feb. 7, 2018, are incorporated by reference herein.

EXAMPLES

Hereinafter, the present invention is described in more detail with Examples. The present invention is, however, not restricted to the following Examples.

Example 1: Preparation of Separation Membrane (1) Preparation of Niobate Nanosheet Colloid Solution A niobate nanosheet colloid solution was prepared by the method described in K. Nakagawa, et al., Chem. Commun., 2014, vol. 50, pp. 13702-13705. Specifically, 1.989 g of niobium pentaethoxide manufactured by Kojundo Chemical Laboratory Co., Ltd. and 3.735 g of triethanolamine manufactured by Wako Pure Chemical Corporation were mixed, and 25 mL of 25 to 28 mass % ammonia water was further added thereto. The obtained solution was transferred into 100 mL volume autoclave to carry out a reaction at 160° C. for 24 hours. Then, the reaction mixture was cooled to an ordinary temperature. Since the obtained reaction mixture had high viscosity and was in a sol condition, the reaction mixture was diluted by adding 50 mL of ultrapure water obtained by purification using an ultrapure water production system ("milli-Q® Direct" manufactured by Merck) in order to reduce the viscosity and obtain a crude colloid dispersion containing niobate ($Nb_3O_8^-$) nanosheet. Since the crude colloid dispersion contained an insoluble solid generated in the reaction, the dispersion was repeatedly subjected to centrifugation till the insoluble solid was not found in order to remove the insoluble solid and the supernatant was obtained as a niobate nanosheet colloid solution. The concentration of the thus obtained niobate nanosheet colloid solution was adjusted to 10 g/L by adding ultrapure water.

(2) Preparation of Graphene Oxide Colloid Solution

A graphene oxide colloid solution was prepared in accordance with the method described in Daniela C. Marcano, et al., ACS Nano, 2010, 4(8), pp. 4806-4814. Specifically, 3 g of graphite powder was added into a round-bottom flask, a mixed acid obtained by mixing 360 mL of $H_2SO_4$ and 40 mL of $H_3PO_4$ was added thereto, and further 18 g of $KMnO_4$ was added thereto. The mixture was stirred at 50° C. for 12 hours and then cooled to room temperature. Next, the solution was poured into a beaker containing the ice prepared from 400 mL of ultrapure water, and 3 mL of 30 mass % $H_2O_2$ solution was added thereto. The mixture was stirred for 30 minutes. The mixture was poured into two different vessels to be divided and respectively subjected to centrifugation at 3500 rpm for 5 minutes to remove a precipitate. The thus obtained liquids were respectively poured into 50 mL volume silicon tubes and subjected to centrifugation at 6000 rpm for 20 minutes to remove a supernatant. After ultrapure water was added as a washing liquid to the remaining precipitate so that the total amount became 40 mL, the mixture was similarly subjected to centrifugation again in order to remove a supernatant. Subsequently, after 30% hydrochloric acid was added as a washing liquid to the remaining precipitate so that the total amount similarly became 40 mL, the mixture was subjected to centrifugation in order to remove a supernatant.

Then, a similar washing procedure was repeated by sequentially using ethanol, water, 30% hydrochloric acid and ethanol. A viscous liquid over the precipitate was removed and the precipitate was dispersed in ultrapure water to obtain a dispersion as a graphene oxide colloid solution.

(3) Preparation of Type-A Composite Separation Membrane

A mixed nitrocellulose supporting membrane having a micropore diameter of 50 nm was immersed in 2.5 vol % aqueous solution of aminopropyltriethoxysilane (APTES) for 2 hour or more. Then, the supporting membrane was set on a suction filtration device and washed by flowing ultrapure water so that the supporting membrane became modified with APTES.

The concentration of the niobate nanosheet colloid solution prepared in the above (1) was adjusted to about 0.8 g/L by adding ultrapure water, and 175 µL of the solution was added into a silicon tube using a micropipette. Ultrapure water was added thereto so that the total amount became 50 mL. Separately, 700 µL of about 0.2 g/L graphene oxide colloid solution was added into a silicon tube using a micropipette, and ultrapure water was added thereto so that the total amount became 50 mL. Amounts of niobate nanosheet and graphene oxide in both of the solutions were respectively about 0.14 mg. Each of the solutions was added into silicon tubes so that a mass ratio of niobate:graphene oxide became 90:10, 55:45 or 25:75 and a total amount of niobate nanosheet and graphene oxide became about 0.14 mg. Ultrapure water was further added thereto so that the total amount became 50 mL to obtain mixed colloid solutions.

Each mixed colloid solution was stirred with giving ultrasonic for 30 minutes. The mixed nitrocellulose supporting membrane modified with APTES was set on a filtration bottle connected to a diaphragm-type vacuum pump ("DTC-22" manufactured by ULVAC KIKO, Inc.), and each mixed colloid solution was added thereto and filtered with suction. The ultimate pressure of the used vacuum pump was about $1.0 \times 10^3$ Pa. The suction was continued for 2 hours after each mixed colloid solution was filtered to dry the membrane under reduced pressure.

A photograph of the cross-section structure of the obtained separation membrane was taken by SEM, i.e. scanning electron microscope, and a thickness of the niobate-graphene oxide mixed layer was measured; as a result, average thicknesses of the niobate-graphene oxide mixed layer of each Type-A composite separation membrane of niobate:graphene oxide=90:10, 55:45 and 25:75 were respectively about 40 nm, about 46 nm and about 52 nm. The average thicknesses of the niobate layer and the graphene oxide layer described later were respectively about 41 nm and about 54 nm; and when the ratio of niobate to graphene oxide was larger, the thickness tended to become thinner. The reason may be that the density of niobate nanosheet is relatively high in comparison with graphene oxide.

Example 2: Production of Type-B Composite Separation Membrane

The same amounts of the niobate nanosheet colloid solution and the graphene oxide colloid solution as those used for producing the above-described Type-A composite separation membrane of niobate:graphene oxide=55:45 were respectively added into different silicon tubes, and ultrapure water was further added thereto to adjust the total amount to be 25 mL. Then, after the mixture was stirred with giving ultrasonic for 30 minutes, the mixed nitrocellulose supporting membrane modified with APTES was set on a filtration bottle connected to a diaphragm-type vacuum pump ("DTC-22" manufactured by ULVAC KIKO, Inc.), and the diluted graphene oxide colloid solution was first added thereto and filtered with suction. After it was confirmed that the whole amount of the graphene oxide colloid solution was filtrated, the above-described diluted niobate nanosheet colloid solution was slowly poured over the graphene oxide layer with guiding the diluted niobate nanosheet colloid solution along a glass rod and filtrated with suction. The suction was continued for 2 hours after the whole amount of the diluted niobate nanosheet colloid solution was filtered to dry the membrane under reduced pressure.

Triethanolamine was not added to the graphene oxide colloid solution, but the graphene oxide layer was first formed and the diluted niobate nanosheet colloid solution containing triethanolamine was added over the graphene oxide layer. Thus, triethanolamine may be possibly present also between graphene oxides in the obtained Type-B composite separation membrane.

Example 3: Production of Type-C Composite Separation Membrane

Type-C composite separation membrane was produced similarly to the above-described Example 2 except that the diluted niobate nanosheet colloid solution was first filtrated with suction and then the diluted graphene oxide colloid solution was filtrated with suction.

Example 4: Production of Type-C Composite Separation Membrane

The same amounts of the niobate nanosheet colloid solution and the graphene oxide colloid solution as those used for producing the above-described Type-A composite separation membrane of niobate:graphene oxide=55:45 were respectively added into different silicon tubes. A diluted niobate nanosheet colloid solution and a diluted graphene oxide colloid solution were respectively prepared similarly to the above-described Example 2 except that triethanolamine was added to the graphene oxide colloid solution in a mass ratio of graphene oxide:triethanolamine=2:1. In addition, Type-C composite separation membrane was produced similarly to the above-described Example 2 except that the diluted niobate nanosheet colloid solution was first filtrated with suction and then the diluted graphene oxide colloid solution was filtrated with suction.

Comparative Example 1: Production of Niobate Separation Membrane

A niobate separation membrane was produced similarly to the above-described Example 1 except that a part of the niobate nanosheet colloid solution prepared in the above-described Example 1(1) containing about 0.14 mg of niobate nanosheet was added into a silicon tube, ultrapure water was added thereto so that the total amount became 50 mL, and only the thus obtained diluted solution was used.

Comparative Example 2: Preparation of Graphene Oxide Separation Membrane

A graphene oxide separation membrane was produced similarly to the above-described Example 1 except that 1400 µL of the graphene oxide colloid solution prepared in the above-described Example 1(2) containing about 0.28 mg of graphene oxide was added into a silicon tube, ultrapure water was added thereto so that the total amount became 50 mL, and only the thus obtained diluted solution was used.

Comparative Example 3: Preparation of Graphene Oxide Separation Membrane

A graphene oxide separation membrane was produced similarly to the above-described Example 1 except that 700 µL of the graphene oxide colloid solution prepared in the above-described Example 1(2) containing about 0.14 mg of graphene oxide was added into a silicon tube, 0.07 mg of triethanolamine was added thereto, then ultrapure water was added thereto so that the total amount became 50 mL, and only the thus obtained diluted solution was used.

Test Example 1: Measurement of Molecular Weight Cutoff

The produced separation membrane was set on a cross flow water permeable device in which water to be treated is flowed in the direction parallel to the separation membrane in accordance with the method described in S. Kawada, et al., Colloids and Surfaces A: Physicochem. Eng. Aspects, 2014, vol. 451, pp. 33-37. The effective area of the separation membrane in the water permeable device was $7.07 \times 10^{-4}$ m$^2$. Ultrapure water containing 1000 ppm of polyethylene glycol of 2 kDa, 4 kDa, 6 kDa or 12 kDa was supplied to the water permeable device under the conditions of a primary side (supply side) pressure of 0.4 MPa (4.0 bar) and a flow rate of 1.0 mL/min. A Stokes radius R was calculated as the maximum micropore radius of the separation membrane by the following formula from the molecular weight of the polyethylene glycol in the permeated water. The results are shown in Table 1. In the following formula, Mw is a molecular weight of polyethylene glycol. In the table, "NbO" is niobate, "GO" is graphene oxide, and "TEOA" is triethanolamine.

$R = (0.262 \times Mw^{0.5} - 0.3) \times 0.1$

TABLE 1

| Separation membrane | | | Molecular weight cutoff (Da) | Micropore diameter (nm) |
|---|---|---|---|---|
| Comparative example 1 | | NbO100 | 5000 | 3.65 |
| Example 1 | Type-A | NbO90/GO10 | 6600 | 4.20 |
| | | NbO55/GO45 | 8700 | 4.83 |
| | | NbO25/GO75 | 1700 | 2.10 |
| Example 2 | Type-B | | 6000 | 4.00 |
| Example 3 | Type C | No TEOA in GO layer | 2800 | 2.71 |
| Example 4 | | TEOA in GO layer | 3100 | 2.86 |

It was found from the result shown in Table 1 that a micropore diameter and a molecular weight cutoff of the composite separation membrane according to the present invention can be adjusted by selecting the type of the composite separation membrane and adjusting ratios of an oxidized metal and graphene oxide.

Test Example 2: Water Permeability Test

Only ultrapure water was filtrated without adding polyethylene glycol to the ultrapure water in the condition of the above-described Test example 1 and an amount of a permeated water was measured 100 minutes after the filtration was started to evaluate the water permeability of each separation membrane by the following formula. The results are shown in FIGS. 1 and 2.

Water permeability=Amount of permeated water (L)/ [$t \times A \times P$]

In the formula, "t" is a time for the filtration (h), "A" is an effective area of the separation membrane (m$^2$), and "P" is a pressure on the primary side (supply side) (bar).

Test Example 3: Salt Rejection Property Test

A ultrapure water solution containing 500 ppm of sodium sulfate or sodium chloride was filtrated without adding polyethylene glycol to the ultrapure water in the condition of the above-described Test example 1, a concentration of sodium in a permeated water was measured using a compact sodium ion meter ("LAQUAtwin B-722" manufactured by HORIBA, Ltd.) after 5 hours, and a salt rejection of each separation membrane was calculated by the following formula. The results are shown in FIGS. 1 and 2.

Salt blocking rate (%)=$(1-C_p/C_f) \times 100$

In the formula, $C_f$ is a sodium concentration in the solution before filtration (500 ppm), and $C_p$ is a sodium concentration in the permeated water (ppm).

It is found from the results shown in FIG. 1 that a water permeability of a separation membrane having a layer composed of graphene oxide only is high, a water permeability is lowered by adding niobate nanosheet, and a water permeability of a separation membrane having a layer composed of niobate sheet only is the lowest. However, surprisingly, a water permeability of Type-A composite separation membrane having a complex layer containing approximately equal amounts of niobate and graphene oxide is superior to that of a separation membrane having a layer composed of graphene oxide only.

In addition, a salt rejection of Type-A composite separation membrane of the present invention is similar or improved in comparison with a separation membrane having a layer composed of niobate nanosheet only or a separation membrane having a layer composed of graphene oxide only.

Furthermore, as the results shown in FIG. 2, Type-A composite separation membrane having a layer containing approximately equal amounts of niobate and graphene oxide exhibits the most excellent water permeability, Type-B composite separation membrane having a graphene oxide layer as a lower layer and a niobate nanosheet layer as a upper layer exhibits more excellent salt rejection property, and Type-C composite separation membrane having a niobate layer as a lower layer and a graphene oxide layer as a upper layer exhibits the most excellent salt blocking property. The reason may be that niobate and graphene oxide respectively have a salt rejection property by different mechanism, and when both layers are laminated, both salt rejection properties are effectively exhibited. In addition, Type-C composite separation membrane which does not contain triethanolamine may exhibit particularly strong electrostatic repulsion, since graphene oxide exhibits stronger electrostatic repulsion to an anion due to a carboxy group on the surface. Furthermore, a salt rejection property may be effectively exhibited at the interface between a niobate layer and a graphene oxide layer.

Test Example 4: Dye Rejection Property Test

A ultrapure water solution containing 10 ppm of evans-blue (molecular weight: 960.8) or acid red 265 (molecular weight: 635.6) as a dye was filtrated without adding polyethylene glycol to the ultrapure water in the condition of the above-described Test example 1, a concentration of each dye in a permeated water was measured using a ultraviolet-visible near infrared spectrophotometer ("V-650" manufactured by Jasco) 5 hours after the filtration was started, and a dye rejection of each separation membrane was calculated. The results are shown in Table 2. In the table, "NbO" is niobate, "GO" is graphene oxide, and "TEOA" is triethanolamine.

TABLE 2

| Separation membrane | | | Rejection of Evans blue | Rejection of Acid red 265 |
|---|---|---|---|---|
| Comparative example 1 | | NbO100 | 99.4% | 92.8% |
| Example 1 | Type-A | NbO55/GO45 | 99.0% | 93.0% |
| Example 2 | Type-B | | 96.3% | 93.8% |
| Example 3 | Type-C | No TEOA in GO layer | 98.1% | 98.4% |

As the results shown in Table 2, the composite separation membrane of the present invention exhibits high rejection to both of the dyes as 90% or more. The reason may be that the dyes cannot be allowed to pass through the composite separation membrane of the present invention due to not only a relatively large molecular weights of the dyes but also electrostatic repulsion, since the dyes are anionic dyes having a plurality of sulfo groups (—$SO_3H$).

Reference Example 1: Stabilization of Graphene Oxide Layer by Triethanolamine

Similarly to the above-described Example 1(3), about 0.14 mg of a graphene oxide layer was formed on a mixed nitrocellulose supporting membrane having a micropore diameter of 50 nm using the graphene oxide colloid solution prepared in the above-described Example 1(2).

Also, a graphene oxide layer was similarly formed on the supporting membrane except that triethanolamine was added to the graphene oxide solution in the concentration of $9.4 \times 10^{-7}$ mol or $3.6 \times 10^{-6}$ mol.

A water permeability and a salt rejection property of the separation membrane were evaluated similarly to the above-described Test examples 2 and 3. The results of the water permeability test and the salt rejection property test are shown in FIG. 3, and photographs of each separation membrane after the salt rejection property test are shown in FIG. 4. In FIGS. 3 and 4, "GO" is graphene oxide, and "TEOA" is triethanolamine.

As the results shown in FIG. 3, a water permeability was lowered but a salt rejection property was improved with the increasing concentration of triethanolamine. On the one hand, when triethanolamine was not used, the graphene oxide layer was peeled as the photograph shown in FIG. 4. Thus, the value of a water permeability of the graphene oxide layer without triethanolamine is a provisional value. As the above results, triethanolamine may bind and stabilize graphene oxides also in a graphene oxide layer, since water is allowed to pass through between graphene oxides in a general graphene oxide layer.

Example 5: Production of Separation Membrane

An anodized alumina supporting membrane manufactured by Whatman (micropore diameter: 20 nm) was immersed in 2.5 vol % aqueous solution of aminopropyltriethoxysilane (APTES) for 15 minutes to 2 hours and then in ultrapure water for 2 hours. The anodized alumina supporting membrane modified with APTES was set on a filtration bottle connected to a diaphragm-type vacuum pump ("DTC-22" manufactured by ULVAC KIKO, Inc.). The niobate nanosheet colloid solution and the graphene oxide colloid of Example 1 were mixed in the ratio of niobate:graphene oxide=55:45 so that the total amount of niobate nanosheet and graphene oxide became about 0.058 mg, and the mixed colloid solution was added on the anodized alumina supporting membrane to be filtered with suction. The ultimate pressure by the used vacuum pump was about $1.0 \times 10^3$ Pa. The suction was continued for 2 hours after each mixed colloid solution was filtered to dry the membrane under reduced pressure. Thus, Type-A composite separation membrane was produced.

In addition, first, the same amount of the niobate nanosheet colloid solution before the mixing was added over the anodized alumina supporting membrane and filtrated with suction. After it was confirmed that the whole amount of the niobate nanosheet colloid solution was filtrated, the same amount of the graphene oxide colloid solution before the mixing was slowly poured over the niobate nanosheet layer with guiding the graphene oxide colloid solution along a glass rod and filtrated with suction. The suction was continued for 2 hours after the whole amount of the graphene oxide colloid solution was filtered to dry the membrane under reduced pressure. Thus, Type-C composite separation membrane was produced.

Furthermore, a niobate nanosheet layer was formed on an anodized alumina supporting membrane using only the niobate nanosheet colloid solution containing about 0.058 mg of niobate nanosheet.

Each separation membrane having an effective area of $2.54 \times 10^{-4}$ $m^2$ was set on a cross flow water permeable device. Methanol was supplied to the water permeable device under the conditions of a primary side (supply side) pressure of 0.2 MPa (2.0 bar) and a flow rate of 1 mL/min. The weight of permeated water was measured with measuring the time, and a liquid permissible property was evaluated similarly to Test example 2.

In addition, a dye rejection was measured using 10 ppm methanol solution of Evans Blue (molecular weight: 960.79), Acid red 265 (molecular weight: 635.6) or Methyl orange (molecular weight: 327.33).

The liquid permissible property and the rejection properties to Evans Blue and Acid red 265 of each separation membrane are shown in FIG. 5, and the rejection to each dye of Type-C composite separation membrane is shown in FIG. 6.

As the result shown in FIG. 5, the methanol permissible property of Type-A composite separation membrane containing niobate nanosheet and graphene oxide is much superior to the layer composed of niobate nanosheet only. In addition, the rejection property of Type-C composite separation membrane is improved in comparison with the layer composed of niobate nanosheet only. It was found from the result shown in FIG. 6 that the molecular weight cutoff of Type-C composite separation membrane is about 1000.

It was experimentally demonstrated as the above-described results that the composite separation membrane of the present invention is also excellent as a membrane to treat an organic solvent.

The invention claimed is:

1. A composite separation membrane,
comprising a supporting base material and a complex layer,
wherein the complex layer is placed on the supporting base material,
the complex layer comprises metallic acid nanosheets, graphene oxide and an alkanolamine,
the metallic acid nanosheets are composed of at least one of metallic acid selected from the group consisting of niobate, titanate, manganate, zirconate, tungstate, molybdate, cobaltate, ferrate, tantalate, zincate, germanate, ruthenate and a complex metallic acid, and
at least one of the alkanolamine is present between the metallic acid nanosheets.

2. The composite separation membrane according to claim 1, wherein the metallic acid nanosheets and the graphene oxide are mixed in the complex layer.

3. The composite separation membrane according to claim 1, wherein the complex layer comprises a layer mainly comprising the graphene oxide and a layer mainly comprising the metallic acid nanosheets.

4. The composite separation membrane according to claim 3, wherein the layer mainly comprising the graphene oxide is placed on the supporting base material and the layer mainly comprising the metallic acid nanosheets is placed thereon.

5. The composite separation membrane according to claim 3, wherein the layer mainly comprising the metallic acid nanosheets is placed on the supporting base material and the layer mainly comprising the graphene oxide is placed thereon.

6. The composite separation membrane according to claim 1, wherein the supporting base material has a hydroxy group at least on the surface, and a silane coupling agent having an ionic group is bound through the hydroxy group.

7. The composite separation membrane according to claim 1, wherein the alkanolamine is a trialkanolamine.

8. The composite separation membrane according to claim 1, wherein the supporting base material is composed of an organic material or an inorganic material.

9. The composite separation membrane according to claim 1, wherein the supporting base material is composed of cellulose.

10. The composite separation membrane according to claim 1, wherein the supporting base material is a filter medium, a microfiltration membrane, an ultrafiltration membrane, a nanofiltration membrane or a reverse osmosis membrane.

11. The composite separation membrane according to claim 1, wherein the complex layer further comprises a cation.

12. The composite separation membrane according to claim 11, wherein the cation is at least one kind of a cation selected from the group consisting of a proton, a metal ion, an ammonium ion and a cationic polymer.

13. A method for treating a liquid, comprising the step of allowing the liquid to be treated to pass through the composite separation membrane according to claim 1.

* * * * *